April 14, 1964 R. E. TOLLESON 3,128,686
CONTINUOUS STRIP PHOTO APPARATUS
Filed Oct. 31, 1958 3 Sheets-Sheet 2

INVENTOR
ROBERT E. TOLLESON
BY
ATTORNEY

April 14, 1964 R. E. TOLLESON 3,128,686
CONTINUOUS STRIP PHOTO APPARATUS
Filed Oct. 31, 1958 3 Sheets-Sheet 3

INVENTOR
ROBERT E. TOLLESON
BY Patrick D. Henry
ATTORNEY

United States Patent Office 3,128,686
Patented Apr. 14, 1964

3,128,686
CONTINUOUS STRIP PHOTO APPARATUS
Robert E. Tolleson, Box 818, Atlanta, Ga.
Filed Oct. 31, 1958, Ser. No. 771,156
1 Claim. (Cl. 95—31)

This invention relates to continuous strip photo apparatus and particularly to apparatus of this sort used in identification photo production and the like wherein a composite booth arrangement contains a camera and continuous photo sensitive strip from which individual photos are cut.

In the production of identification photos for use on armed forces ID cards, defense plant badges, and the like, and also in the fast commercial photographic work for immediate production of photos for passports, it is desirable to use one of the well known film strip photographic materials in continuous rolls. In one instance, no negative is used since the picture appears directly on the direct positive photographic positive strip as a positive and the individual pictures are cut therefrom. Arrangements for this purpose are found in variety 5 and 10¢ stores, bus stations and similar places.

Such apparatus must include a camera, a photo sensitive strip, cutting mechanism, darkroom, lighted posing space for the individual being photographed, some way of getting the photo strip out after cutting to develop same and various other odds and ends of equipment requiring a light-proof box and presenting a space problem and considerable inconvenience. There is a need for a composite arrangement providing all of this; there is a demand for a basic photo strip device which can be used with a closed camera box to deliver the strip in proper location for photographing and then for cutting. This invention presents such a device.

Generally described without limitation on the scope of my invention, there are two primary things presented herein: the overall or composite picture-taking apparatus as a whole, which includes as a part thereof the photo strip apparatus. The overall apparatus is a booth-like affair having a darkroom in the back and a lighted posing space in the front so that the picture-taking (or camera apparatus) is arranged between the two. The entire camera apparatus may be supported in the wall between the darkroom and the posing space inside a large compartment in which is placed the box-like container having the film strip apparatus therein. The camera box is normally closed and has access doors at the back and on the top thereof. Mounted on the front of the box are the controls used to cut the film after taking a picture and to turn the film strip to another unexposed spot. These controls are operable from alongside the booth itself so that the operator can pose the subject and take and cut the picture. Therefore the camera box can be used without the booth and darkroom and without going inside the darkroom or booth.

The controls are connected in the camera box with the film strip apparatus which forms an important part of this invention. A film strip base member having flat upper surface providing the bottom of a film track receives a top plate thereon having the film track top. The top plate has a prism box with a reflective surface therein to direct light coming horizontally therein directly vertically downward. A spring loaded, rubber coated roller operates through an opening in the top against the film strip top and a drive roller beneath said top is connected with an external control to drive the photo strip between the rollers across in the track and feeding horizontally through the bottom of said prism and out the end of the top plate. A cutter on said base consists of a blade and link actuator connected with the external controls so that the film is cut manually by remote control. An automatic film advance stop pawl on the base is set as desired to move the film a desired length and then lock. With this overall arrangement, a roll of film is loaded in the camera box and fed through the film strip apparatus. Then pictures may be taken, each picture advanced by remote control and cut while still within the box. When desired, the operator enters the darkroom and processes the pictures.

An object of this invention is the provision of a remote control for film advancing and film cutting so that one, several, or a considerable number of pictures may be taken from one continuous roll and cut therefrom as required.

An additional object resides in the arrangement of the base member and horizontal film track coupled with the prism box and vertical transfer whereby incoming horizontal light is reflected vertically to a horizontal photo strip.

Another object is found in the arrangement of the camera box, booth, and remote controls for the camera.

One particularly desirable feature of this invention is provided in the film strip apparatus whereby by simple switching of parts the entire apparatus can be assembled for operation from either the left hand or the right hand side of the booth thereby permitting use on either side of a room near a corner.

An additional object is found in the unitary formation of the base and the separate top plate lending themselves to be cast in quantity.

Other and further objects and advantages, of more or less importance depending upon the particular problems of the user, will be apparent from the following description taken in conjunction with the accompanying drawings, in which.

Figure 1:
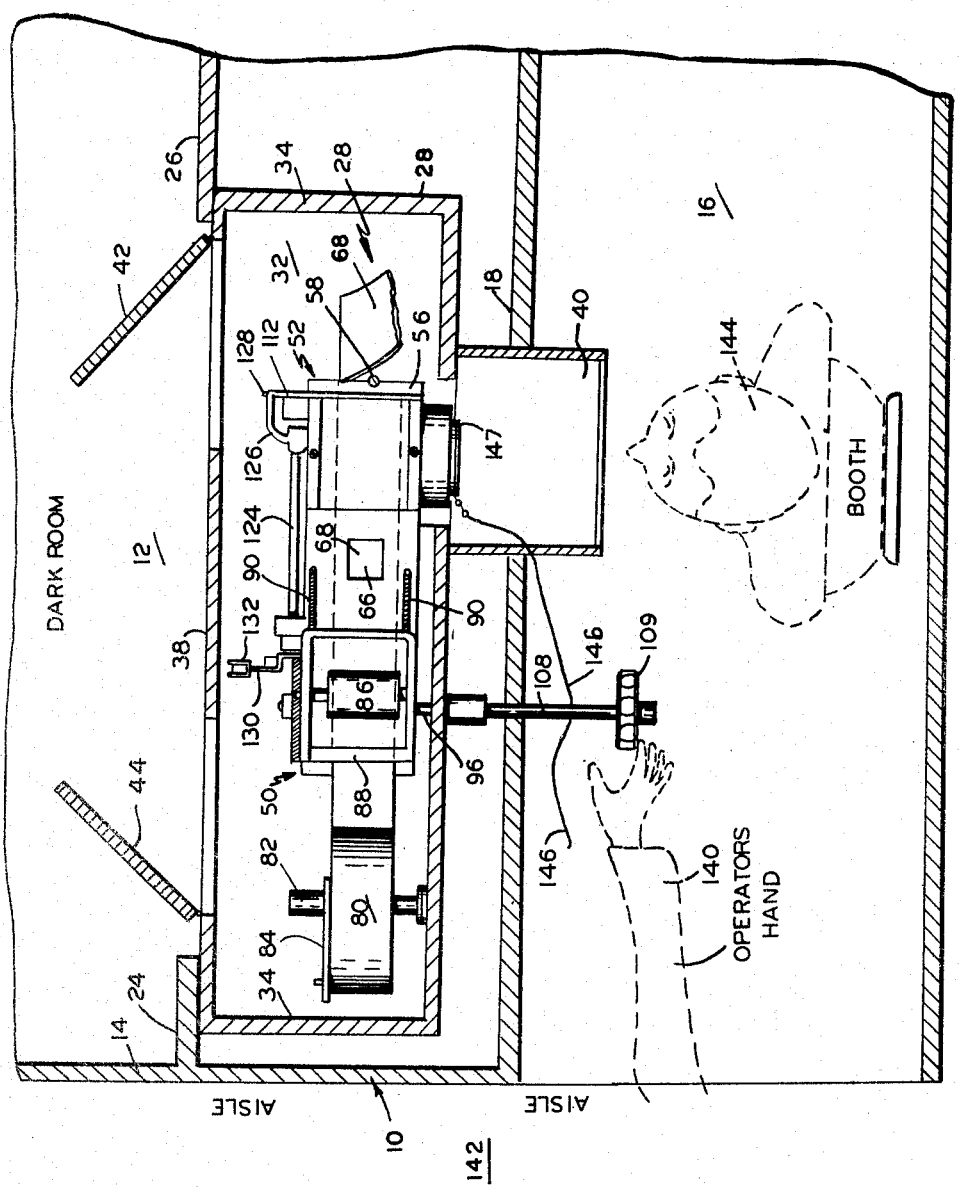
FIG. 1 is a top plan view of a typical composite photo booth with the top covers sectioned away to show the inside details.

Referring initially to the overall picture-taking set-up in FIG. 1, it is seen that a booth structure 10 which may be made from light weight plywood or the like, consists of a closet-like arrangement with a separate darkroom space 12 at the rear closed by sides 14, which is divided from the posing space 16 by a dividing wall 18 in which the camera apparatus 20 is positioned. The camera apparatus 20, including the novel film strip apparatus 22, is supported behind wall 18 by supports 24, 26. The back of apparatus 20 is accessible to the darkroom 12.

Figure 2:
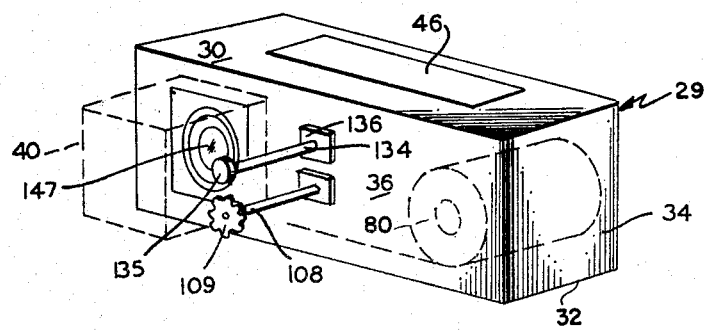
FIG. 2 is a front perspective view of a modified form of camera box from that of FIG. 1 in that the controls are for right side operation as opposed to left side operation in the FIG. 1 embodiment.

Camera apparatus 20 is removably mounted on and within a camera box 28 of generally rectangular construction with top 30, bottom 32, sides 34, front 36, back 38, and removable open-box lens hood 40 substantially the same in both the FIG. 1 and the FIG. 2 embodiments. Back 38 has a pair of access doors 42, 44 therein and top 30 has a large access door 46 therein, all being accessible from within the darkroom 12 to adjust and remove film.

Figure 6:
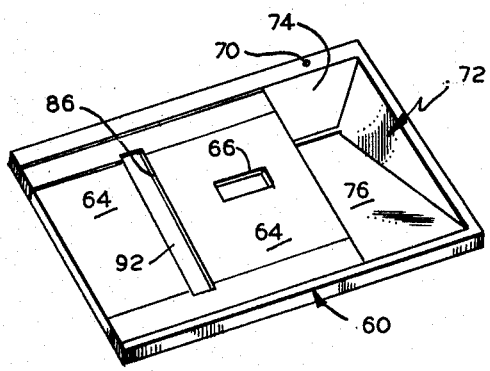
FIG. 6 is a bottom perspective view of the top plate removed and inverted from the device in FIG. 5 to show the top of the film track.
Figure 4:
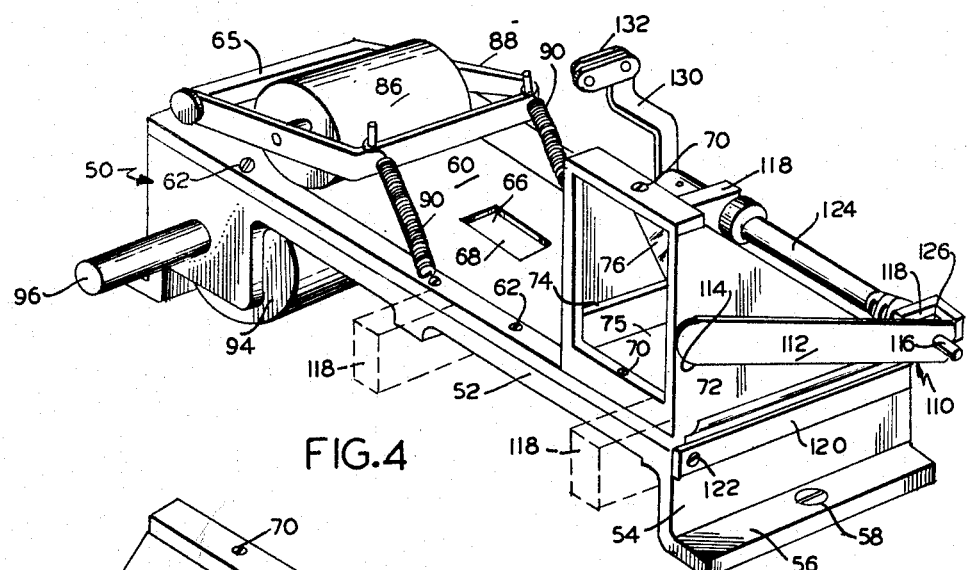
FIG. 4 is a front perspective view of the film strip apparatus shown inside the box in FIG. 1.
Figure 5:
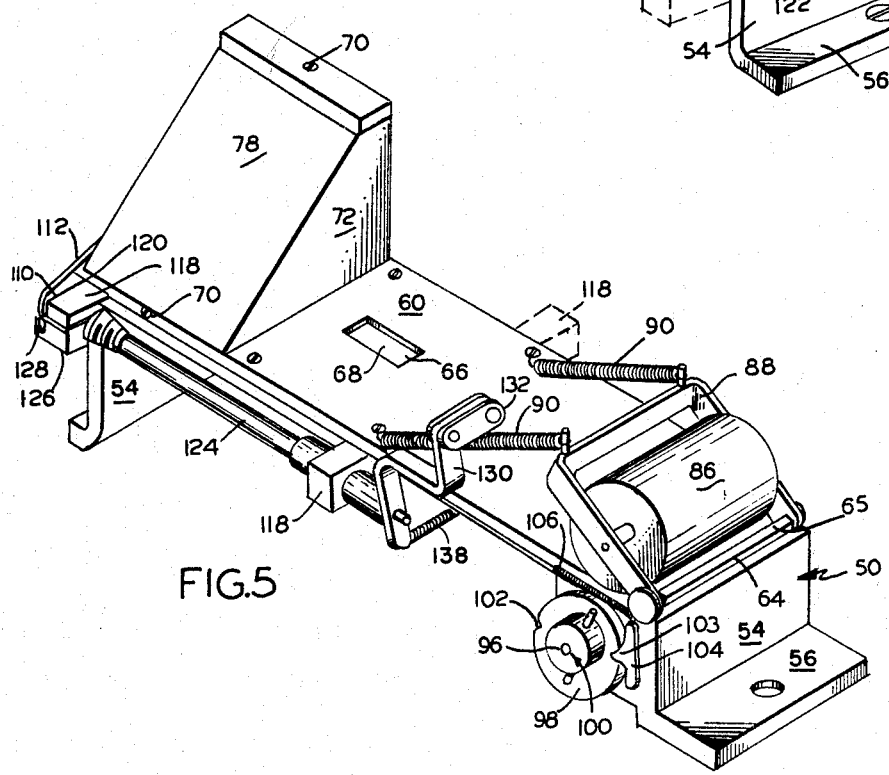
FIG. 5 is a rear perspective view of the device on FIG. 4.

The photo strip apparatus 50 of this invention is shown most clearly in FIGS. 4, 5 and 6 and consists of an upright, unitary stand-like structure supported by a base member 52 with sides 54 and attaching flanges 56 screwed by bolts 58 to the bottom 32 of camera box 28. The base 52 has one side of a film track formed on the top surface thereof along its longitudinal axis.

Removably mounted on top of base 52 is the top plate 60 of rectangular construction and which is screwed in place on base 52 by screws 62 along the outer periphery. As is seen in FIG. 6, the underside of top plate 60 has an elongated film track 64 therein matching with its complementary bottom part on the top of base 52 to form a film track space closed between two opposed plates. Top plate 60 has a photo strip inspection and adjustment opening 66 therein. Photo strip 68 passing through the track 64 is visible through opening 66 and can be moved for adjustment and alignment by hand therethrough.

Removably mounted on top plate 60 by screws 70 is a mirror box 72 with open front 74, open bottom 75 and highly polished, accurately formed mirror surface 76 on the underside of the slanted top 78. When the plane of the front opening 74 is substantially vertical, light through the opening strikes the mirror 76 and is reflected downwardly against the flat, horizontally disposed surface of the film sheet 68. Therefore, light travelling horizontally from the subject is taken through a vertical opening 74 and reflected by a mirror 76 to a horizontal surface.

The photo strip 68 normally is provided in large rolls 80 mounted on a spindle 82 inside box 28 and held in place by a pivoted bar 84. The film 68 is lead in one end 65 of the track 64 at one end of the base 52. A top film feed roller 86 is mounted on a U-frame 88 and spring tensioned in place by springs 90 to engage the top surface of film 68 through an opening 92 in the top plate. A bottom main drive roller 94 is mounted on a shaft 96 extending transversely of the base 52 from each side thereof. The back end of shaft 96 has a measuring disc 98 thereon held in place by a collar and pin arrangement 100 and having indented slots 102 therein into which will drop cam tooth 103 of a pawl lock arm 104 spring tensioned on base 52 by a spring 106. Pawl 104 through tooth 103 measures and temporarily locks the shaft 96 at preselected intervals of rotation so that the desired amount of photo strip may be fed each time simply by turning the shaft 96 until the click is heard and the shaft locks against further motion. It is easy to force tooth 103 from the slot 102 by using more initial torque on shaft 96. Main drive roller 94 engages the bottom surface of film 68 which is pushed thereagainst from the top by the spring tensioned roller 86. Accordingly, film 68 is driven by roller 94 through the nibs of rollers 94, 86 across film track 64 beneath the mirror box 72 and across open bottom 75 thereof. The film 68 then exits from an opening end 107 in base 52. Remote operation is accomplished by an extension rod 108 connected to shaft 96 and with a turn knob 109 thereon. Rod 108 extends from box 20 and through wall 18.

As film 68 exits, it passes through a knife structure 110 consisting of a movable knife blade 112 with cutting edge 114 mounted by a pivot pin 116 on a lug 118 of pair of lugs formed on base 52; and a knife bar 120 fixed adjacent opening end 52 by screws 122. The knife is actuated against knife bar 120 to cut film 68 passing therethrough by means of a control shaft 124 rotatably mounted on spaced lugs 118 and having an offset actuating bracket 126 with a slot in which is positioned a projecting lug 128 fixed on knife 112. An operating lever 130 is fixed on the end of rod 124 and has an upper link 132 connected with a push-pull control rod 134 mounted on a plate 136 in the front of box 20 and having a knob 135 thereon. A return coil spring 138 is attached to the bottom of lever 130 and to the base 52 to resist actuation of the knife 112 and to return same to normal position just above film 68 passing through the track.

In the formation of base 52, originally an additional set of lugs 118 is provided on the back so that the base 52 and top plate assembly 60 may be later adapted to either right hand or left hand camera depending upon the location of the camera box 28, the aisle next to the booth 10 and the darkroom 12. Since the device is most conveniently used from one side or the other, the operator 140 stands in an aisle 142 and operates both knobs 109 and 135 to expose the strip 68 and to advance and cut the film after each desired sequence. The subject 144 is posed in booth posing space 16 in front of hood 40. A shutter actuating string 146 is used to take the picture through lens 147 mounted on box 36 and after each exposure the knob 109 is turned to advance the film the desired amount at which time pawl 104 drops into a notch 102 and then the film end is cut from the strip 68 by pulling the push-pull knob 135 to actuate the knife 112 against the film. The size of the photo sensitive strip 68 and the photographic characteristics and nature thereof (emulsion, or photo positive and so forth) can be varied as desired. Also, the measuring disc 98 may be changed to any other disc that is of such size and number of slots 102 to measure the advance of strip as desired. One picture may be taken and then cut or a whole series of pictures may be taken on a long strip before cutting. The camera box 28 is versatile and portable and independently of any booth structure may be taken to a place, set up, operated, and later removed to a darkroom for processing.

Figure 3:
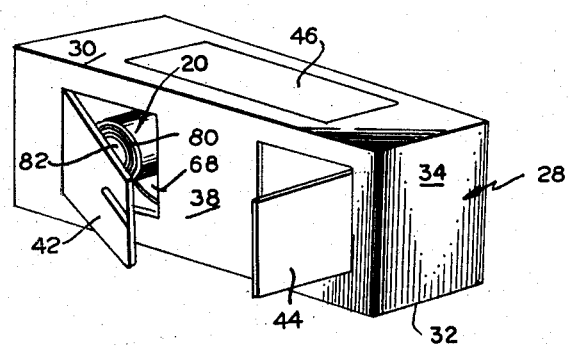
FIG. 3 is a back perspective view of the box shown in FIG. 2.

The camera box 28 in FIGS. 2 and 3 is arranged for left hand operation from an aisle on the right hand side of the box whereas the one in FIG. 1 is arranged for right hand operation. The same camera box equipment is used both in the devices of FIG. 1 and in FIG. 2. As mentioned heretofore, base 52 is cast originally with two sets of lugs 118 and one set thereof is eliminated in assembly of the device by cutting away as soon as the use of the base (either right or left hand) is determined. Mirror box 72 can be assembled facing in one of two positions 180 degrees apart in the same spot on top plate 60. Then, using the appropriate set of lugs 118, the knife structure 110 is mounted on this set of lugs to place the controls 109 on whichever side is desired. The extra set of lugs 118 are then removed.

When direct photos are taken on the strip 68 then the conventional direct positive paper is used and processed directly to produce a positive print directly on the strip itself. If a negative is to be produced so that some other type positive print paper can be used (as in the case of passports) then the photo sensitive paper strip 68 is used in the same manner and either processed to make a negative or else the mirror of the prism 72 can be eliminated and the entire photo strip unit apparatus 50 bolted to the inside back 38 of box 20 to place the photo sensitive paper vertically and directly behind the lens to receive light horizontally through the lens 147. Controls 108, 109 and 135, 136 may be extended through the bottom of the box and operated therefrom. This type rearrangement is especially useful in taking mass photos in schools and the like to produce negatives first which later can be processed into the selected positives. Box 20 is easily set up in any convenient spot in the school and the photos are taken continuously as fast as the subjects can be posed and the film strip advanced.

While I have shown and described in detail a particular embodiment of my invention with a suggested variation therein to change from right to left hand operation and with a different and modified form which can be used to make direct negatives, this is only to acquaint those interested with the particularities of certain forms of my invention and is by no means any sort of limitation on the scope thereof since various alterations, substitutions, eliminations, changes, variations, and modifications may be made in what is shown herein without departing from the scope of my invention shown in the appended claim.

I claim:

In a photo unit, a closed box having entrance means therein, a base member, said base having an elongated top surface on which a continuous strip may travel, a top plate member complementary to said base member and having a strip track formed on the underside thereof, said underside of said plate member fitting against said top surface to place said track in juxtaposition with said top surface forming a strip entrance and a strip exit therewith on opposite ends thereof, attachment members on said base attached to said box, a continuous roll of photo strip material mounted for rotation on said box and the strip therefrom lead through said entrance and through said track from said exit, a box on said base having a reflective surface therein, said strip being exposed through said lens at one position thereof moving through said box, a knife blade mounted adjacent said exit to contact and cut the strip coming therefrom, a control member for said knife blade extending remotely therefrom to the outside of said box, and means automatically stopping said hand drive of said strip at a pre-selected amount of extension of said strip to halt said strip temporarily at each desired exposure area on said strip, two pairs of lugs on opposite sides of said base, a knife control shaft on one of said pairs of lugs, said box having a front opening to said lens and a bottom opening over said strip, said box being positionable in either one of two opposite positions over said strip to place the lens on selectively the right hand side or the left hand side, said pair of lugs being selected according to the direction of said box, whereby said box may be selected for one of right and left hand operation thereby placing said control and lugs in a corresponding position.

References Cited in the file of this patent

UNITED STATES PATENTS

| | | |
|---|---|---|
| 983,926 | Oiler | Feb. 14, 1911 |
| 1,344,896 | Jobke | June 29, 1920 |
| 1,740,279 | Bornmann | Dec. 17, 1929 |
| 1,747,328 | Bornmann | Feb. 18, 1930 |
| 1,945,063 | Moone | Jan. 30, 1934 |
| 1,966,078 | Ohmer et al. | July 10, 1934 |
| 2,043,004 | Lloyd et al. | June 2, 1936 |
| 2,388,423 | Langdon | Nov. 6, 1945 |
| 2,474,159 | Pejois | June 21, 1949 |
| 2,524,941 | Taylor | Oct. 10, 1950 |
| 2,533,099 | Earhart | Dec. 5, 1950 |
| 2,910,924 | Bouwers | Nov. 3, 1959 |

FOREIGN PATENTS

| | | |
|---|---|---|
| 21,190 | Australia | July 15, 1929 |